United States Patent
Jira et al.

(10) Patent No.: US 8,760,432 B2
(45) Date of Patent: Jun. 24, 2014

(54) FINGER POINTING, GESTURE BASED HUMAN-MACHINE INTERFACE FOR VEHICLES

(75) Inventors: Joseph Charles Jira, Canton, MI (US); Theodore Charles Wingrove, Canton, MI (US); Royce Duchante Channey, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 882 days.

(21) Appl. No.: 12/886,795

(22) Filed: Sep. 21, 2010

(65) Prior Publication Data

US 2012/0068956 A1    Mar. 22, 2012

(51) Int. Cl.
*G06F 3/045*    (2006.01)
*G06T 13/00*    (2011.01)

(52) U.S. Cl.
USPC ........................................ 345/174; 345/474

(58) Field of Classification Search
USPC .................................. 345/156, 163, 174, 168
See application file for complete search history.

(56) References Cited

U.S. PATENT DOCUMENTS

| | | | |
|---|---|---|---|
| 6,624,833 B1 | 9/2003 | Kumar et al. | |
| 7,598,942 B2 | 10/2009 | Underkoffler et al. | |
| 2002/0186198 A1 | 12/2002 | Coghan, IV | |
| 2003/0132913 A1 | 7/2003 | Issinski | |
| 2004/0080493 A1 | 4/2004 | Kenin | |
| 2005/0024338 A1 | 2/2005 | Ye | |
| 2006/0050052 A1 | 3/2006 | Mekenkamp et al. | |
| 2006/0187196 A1* | 8/2006 | Underkoffler et al. | 345/156 |
| 2007/0130547 A1 | 6/2007 | Boillot | |
| 2007/0211031 A1* | 9/2007 | Marc | 345/163 |
| 2008/0065291 A1 | 3/2008 | Breed | |
| 2008/0100572 A1 | 5/2008 | Boillot | |
| 2009/0046059 A1 | 2/2009 | Hou et al. | |
| 2009/0278915 A1 | 11/2009 | Kramer et al. | |
| 2009/0309765 A1 | 12/2009 | Wang et al. | |
| 2009/0322673 A1 | 12/2009 | Cherradi El Fadili | |
| 2009/0327974 A1 | 12/2009 | Abanami et al. | |

* cited by examiner

*Primary Examiner* — Michael Faragalla
(74) *Attorney, Agent, or Firm* — Fraser Clemens Martin & Miller LLC; J. Douglas Miller

(57) ABSTRACT

An adaptive interface system includes a user interface for controlling a vehicle system, a sensor for detecting a position of an extremity of a user and generating a sensor signal representing the position of the extremity, and a processor in communication with the sensor and the user interface, wherein the processor receives the sensor signal, analyzes the sensor signal based upon an instruction set to determine a pointing vector of the user, and configures the user interface based upon the pointing vector of the user.

19 Claims, 4 Drawing Sheets

FINGER POINTING, GESTURE BASED HUMAN-MACHINE INTERFACE FOR VEHICLES

FIELD OF THE INVENTION

The present invention relates generally to a human-machine-interface. In particular, the invention is directed to an adaptive interface system and a method for interacting with a user interface based on a tracking of a user.

BACKGROUND OF THE INVENTION

Current vehicle systems have user interfaces that include one or more of the following elements: a display, a touch screen, a touch sensor, a control knob, a user-engageable button, and other controllers. Typically, users actuate a control by direct contact or physical manipulation. Most recently, vehicles also use voice commands to allow users to interact with the vehicle HMI. Additionally, some advanced automotive concepts have been shown that feature simple hand/finger gestures or handwriting-based gestures.

For example, U.S. Pat. Appl. Pub. No. 2009/0309765 discloses a system and a method for using images captured from a digital camera to control navigation through a three-dimensional user interface.

U.S. Pat. No. 6,624,833 discloses a gesture based input interface system with shadow detection, wherein the input interface system provides gesture-based user control of an application running on a computer by classification of user gestures in image signals.

In U.S. Pat. No. 7,598,942, a system and a method for gesture based control is shown. The system provides a gestural interface to various visual elements presented on a display screen.

U.S. Pat. Appl. Pub. No. 2008/0065291 discloses a system and a method for controlling a component in a vehicle including an image receiving system for receiving images of an occupant of the vehicle, wherein the system is arranged to recognize gestures in the received images, e.g., hand gestures, and a control system coupled to the image receiving system for controlling the component based on the recognized gestures.

However, there remains a need for an accurate, touchless means for interacting with a user interface in a vehicle environment.

Accordingly, it would be desirable to develop an adaptive user interface wherein a visual output of the user interface is automatically configured based upon a pointing vector derived from a position of a portion of a body of a user to highlight a visual output that is in substantial alignment with the pointing vector.

SUMMARY OF THE INVENTION

Concordant and consistent with the present invention, an adaptive user interface wherein a visual output of the user interface is automatically configured based upon a pointing vector derived from a position of a portion of a body of a user to highlight a visual output that is in substantial alignment with the pointing vector, has surprisingly been discovered.

In one embodiment, an adaptive interface system comprises: a user interface for controlling a vehicle system; a sensor for detecting a position of an extremity of a user and generating a sensor signal representing the position of the extremity; and a processor in communication with the sensor and the user interface, wherein the processor receives the sensor signal, analyzes the sensor signal based upon an instruction set to determine a pointing vector of the user, and configures the user interface based upon the pointing vector of the user.

In another embodiment, an adaptive interface system for a vehicle comprises: a user interface disposed in an interior of the vehicle, the user interface having a display for communicating an information to a user representing a condition of a vehicle system; a sensor for detecting a position of an extremity of a user and generating a sensor signal representing the position of a portion of the extremity of the user closest to the user interface; a storage device for storing a vector node representing an estimated position of a portion of a body of the user; and a processor in communication with the sensor, the storage device, and the user interface, wherein the processor receives the sensor signal, determines a pointing vector of the extremity of the user based upon at least the position of the portion of the extremity of the user closest to the user interface and the vector node, and configures the display based upon the pointing vector of the extremity of the user to emphasize a particular visual output presented on the display.

Methods for configuring a display are also disclosed.

One method comprises the steps of: providing a user interface for controlling a vehicle system; providing a sensor to detect a position of at least a portion of an extremity of a body of a user; defining a vector node associated with an estimated position of a pre-determined portion of the body of the user; determining a pointing vector derived from the position of the extremity of the body of the user and the node; and configuring the user interface based upon the pointing vector to designate at least a portion of the user interface within a field of pointing of the pointing vector.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
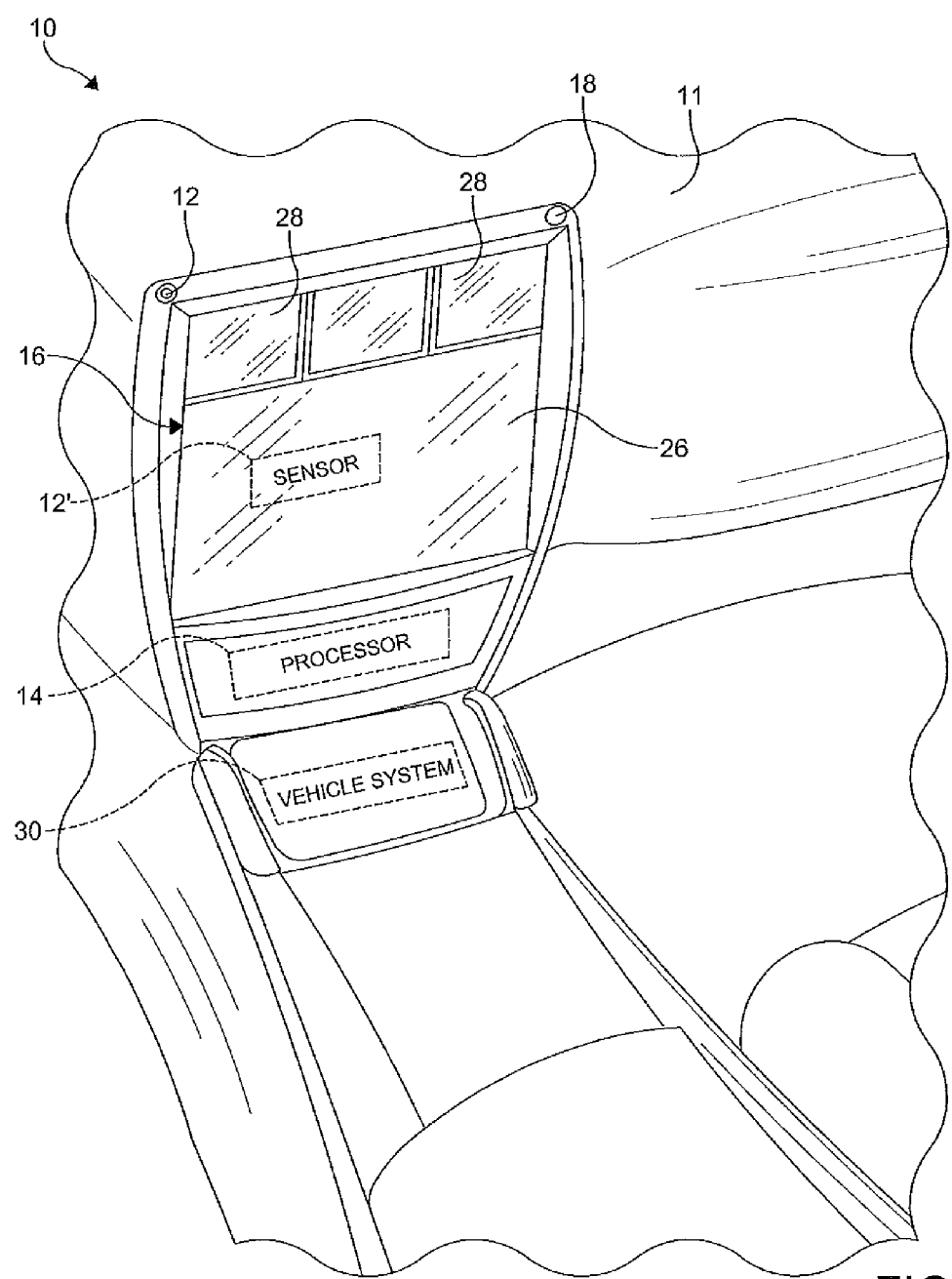
FIG. 1 is a fragmentary perspective view of an interior of a vehicle including an adaptive interface system according to an embodiment of the present invention.
Figure 2:
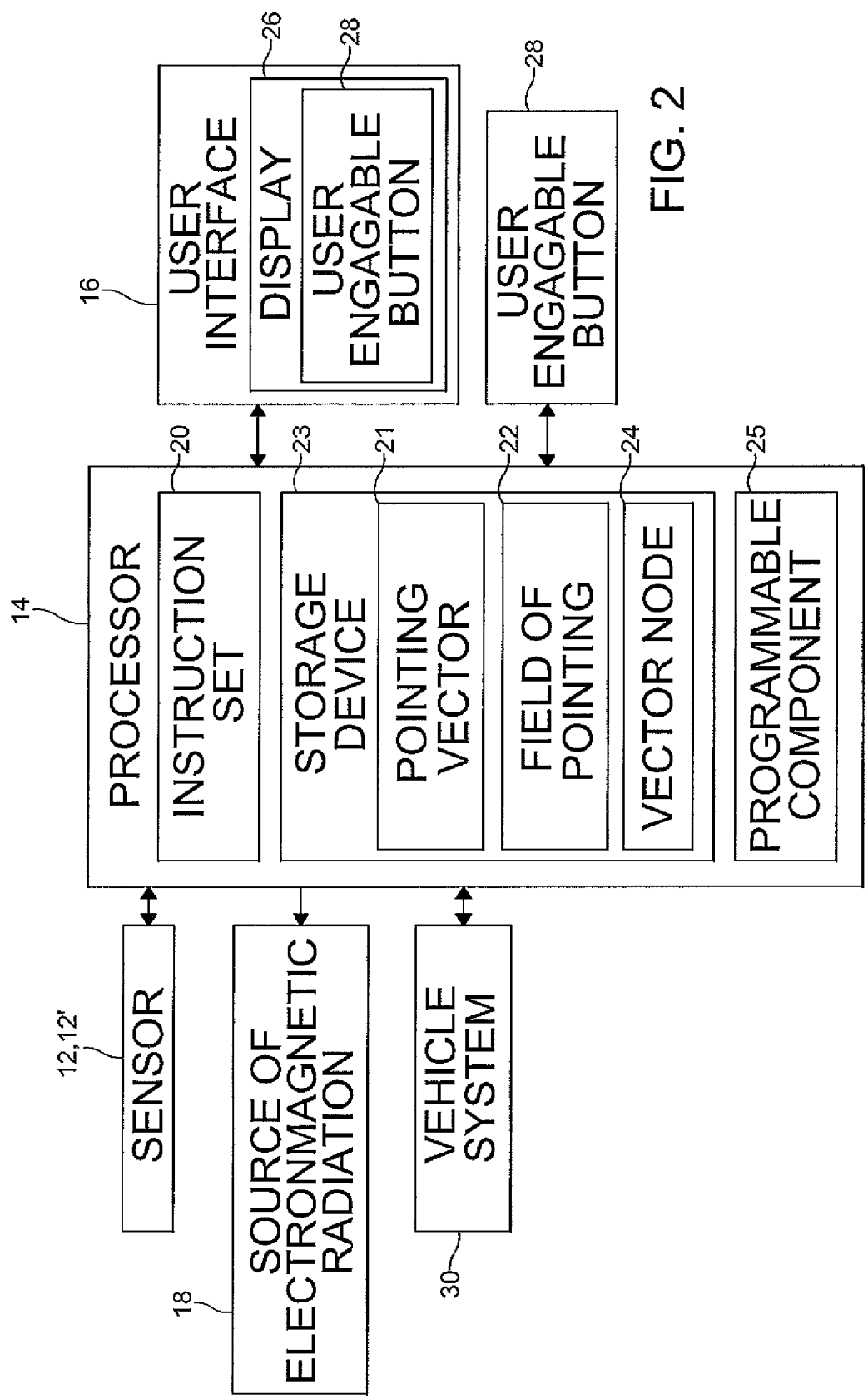
FIG. 2 is a schematic block diagram of the interface system of FIG. 1.

FIGS. 1-2 illustrate an adaptive interface system 10 for a vehicle 11 according to an embodiment of the present invention. As shown, the interface system 10 includes a sensor 12, a processor 14, and a user interface 16 (or control device). The interface system 10 can include any number of components, as desired. The interface system 10 can be integrated in any user environment.

The sensor 12 is a user tracking device capable of detecting a position of at least a portion of a body of the user. As a non-limiting example, the sensor 12 is detects a position of an extremity (e.g. a fingertip, a hand, an arm, etc.) of a user.

In certain embodiments, the sensor 12 is a complementary metal-oxide-semiconductor (CMOS) camera for capturing an image of at least a portion of an arm (e.g. hand, finger, and the like) of the user and generating a sensor signal representing the captured image. However, it is understood that other cameras and image capturing devices can be used. It is further understood that other sensors (i.e. independent or paired with a camera sensor) can be used such as an infrared sensor or a projected capacitance sensor 12' integrated with the user interface 16, for example.

In certain embodiments, a source of radiant energy 18 is disposed to illuminate at least a portion of an extremity of the user. As a non-limiting example, the source of radiant energy 18 may be an infra-red light emitting diode. However, other sources of the radiant energy can be used.

The processor 14 may be any device or system adapted to receive an input signal (e.g. the sensor signal), analyze the input signal, and configure the user interface 16 in response to the analysis of the input signal. In certain embodiments, the processor 14 is a micro-computer. In the embodiment shown, the processor 14 receives the input signal from at least one of the sensors 12, 12' and a user-provided input via the user interface 16.

As shown, the processor 14 analyzes the input signal based upon an instruction set 20. The instruction set 20, which may be embodied within any computer readable medium, includes processor executable instructions for configuring the processor 14 to perform a variety of tasks. The processor 14 may execute a variety functions such as controlling the operation of the sensor 12, 12' and the user interface 16, for example. It is understood that various algorithms and software can be used to analyze an image of an extremity of the user to determine a pointing vector 21 representing at least a pointing direction of the extremity of the user.

As a non-limiting example, the instruction set 20 is a learning algorithm adapted to determine the pointing vector 21 of an extremity of a user based upon the information received by the processor 14 (e.g. via the sensor signal). As a further non-limiting example, the processor 14 determines a field of pointing 22 (i.e. a field of designation) based on the pointing vector 21 of the extremity of the user, wherein the field of pointing 22 is defined by a pre-determined range of degrees (e.g. +/−five degrees) diverging from the pointing vector 21. It is understood that any range of degrees relative to the calculated pointing vector 21 can be used to define the field of pointing 22.

In certain embodiments, the processor 14 includes a storage device 23. The storage device 23 may be a single storage device or may be multiple storage devices. Furthermore, the storage device 23 may be a solid state storage system, a magnetic storage system, an optical storage system, or any other suitable storage system or device. It is understood that the storage device 23 may be adapted to store the instruction set 20. Other data and information may be stored and cataloged in the storage device 23 such as the data collected by the sensor 12, 12' and the user interface 16, the calculated pointing vector 21, and the field of pointing 22, for example. In certain embodiments, a pre-defined vector node 24 representing a position of a portion of a body of the user can be calculated and stored on the storage device 23 for subsequent retrieval. It is understood that any number of the vector nodes 24 can be calculated and stored in order to determine the pointing vector 21. It is further understood that each of the vector nodes 24 can represent any portion of the body of the user.

The processor 14 may further include a programmable component 25. It is understood that the programmable component 25 may be in communication with any other component of the interface system 10 such as the sensor 12, 12' and the user interface 16, for example. In certain embodiments, the programmable component 25 is adapted to manage and control processing functions of the processor 14. Specifically, the programmable component 25 is adapted to modify the instruction set 20 and control the analysis of the signals and information received by the processor 14. It is understood that the programmable component 25 may be adapted to manage and control the sensor 12 and the user interface 16. It is further understood that the programmable component 25 may be adapted to store data and information on the storage device 23, and retrieve data and information from the storage device 23.

The user interface 16 can include any device or component (e.g. buttons, touch screens, knobs, and the like) to control a function associated with the vehicle 11. It is understood that the user interface 16 can be defined as a single device such as a button or control apparatus, for example. It is further understood that the user interface 16 can be disposed in various locations throughout the vehicle 11.

As shown, the user interface 16 includes a display 26 for presenting a visible output to the user. It is understood that any number of the displays 26 can be used, including one. It is further understood that any type of display can be used such as a two dimensional display, a three dimensional display, a touch screen, and the like.

In the embodiment shown, the display 26 is a touch sensitive display (i.e. touch screen) having a plurality of user-engageable buttons 28 presented thereon. The buttons 28 are associated with an executable function of a vehicle system 30 such as a navigation system, a radio, a communication device adapted to connect to the Internet, and a climate control system, for example. However, any vehicle system can be associated with the user-engageable buttons 28. It is further understood that any number of the buttons 28 can be included and disposed in various locations throughout the vehicle 11 such as on a steering wheel or console, for example.

In operation, the user interacts with the interface system 10 in a touchless manner. The processor 14 continuously receives the input signals (e.g. sensor signal) and information relating to the position of the user. The processor 14 analyzes the input signal and the information based upon the instruction set 20 to determine the pointing vector 21 of the user and generate a personalized configuration (or activation) of the user interface 16 in response to the pointing vector 21. It is understood that the user can interact (in a touchless manner) with one of the user-engageable buttons 28 integrated with the display 26 or disposed in various location throughout the vehicle 11 (e.g. on a steering wheel, dash board, console, or center stack).

As a non-limiting example, at least one image of an extremity of the user is captured. The image is outputted via the sensor signal to the processor 14 for calculating the pointing vector 21. As a further non-limiting example, the projected capacitance sensor 12' can be used to detect the presence of the extremity of the body of the user within a sensing zone of the sensor 12'. The information gathered by the sensor 12' is outputted via the sensor signal to the processor 14 for calculating the pointing vector 21.

The processor 14 analyzes the input signal (e.g. sensor signal) to determine a position of the extremity (e.g. finger, hand, arm) of the user relative to the user interface 16. As a non-limiting example, the image data represented by the sensor signal is analyzed by the processor 14 to define the extremity within the captured image. In certain embodiments, the pixels of the captured image are analyzed (e.g. threshold analysis) to define a peripheral edge of the extremity of the user.

Once the extremity is defined in the image, a relative position of a portion (e.g. finger tip) of the extremity of the user that is closest to the user interface 16 can be determined. It is understood that the location of the extremity relative to the user interface 16 can be calculated based upon a known position of the user interface 16 or further image processing techniques known in the art. It is further understood that the projected capacitance sensor 12' can locate the extremity of the user based upon a sensed disturbance in the capacitive sensing zone of the sensor 12', as understood in the art. Other sensors and positioning techniques can be used, as appreciated by one skilled in the art.

The relative position of the portion of the extremity of the user closest to the user interface 16 is stored as one of the vector nodes 24. It is understood that various portions of the extremity of the user can be designated by the vector nodes 24 and stored. As a non-limiting example, a position of a shoulder of the user is independently estimated and stored as another one of the vector nodes 24. It is understood that a position of any portion of the body of the user can be estimated. However, satisfactory results have been achieved when estimating the position of a relatively static portion (e.g. shoulder, hip, etc.) of the body of the user, while the user is in the vehicle 11.

The processor 14 can then calculate the pointing vector 21 by applying a best fit line algorithm to at least two of the vector nodes 24. It is understood that multiple vector nodes 24 can be generated by the processor 14 based upon the analysis of the input signal. It is further understood that various best fit line algorithms and formulas can be used to "fit" the pointing vector 21 over the vector nodes 24.

Once the pointing vector 21 is generated, the processor 14 simulates an extension of the pointing vector 21 toward the user interface 16 (or any component in communication with the processor 14 such as one of the user engageable buttons 28, for example). The portion of the user interface 16 (or other component, e.g. user engageable buttons 28) intersected by the pointing vector 21 represents a center of the field of pointing 22. A tolerance range around the center point of the field of pointing 22 can be defined by pre-defined settings of the processor 14 and instruction set 20.

The user interface 16 is automatically configured by the processor 14 based upon the pointing vector 21 of the user. As a non-limiting example, the processor 14 automatically configures the visible output presented on the display 26 in response to the detected position of the hand of the user and the calculated pointing vector 21. As a further non-limiting example, the processor 14 configures an executable function associated with the user interface 16 (e.g. the button 28) based upon the pointing vector 21 of the user. It is understood that the processor 14 can configure (e.g. designate) one of the user engageable buttons 28 (or other control device) that is within the field of pointing 22 of the calculated pointing vector 21. It is further understood that once the user engageable button 28 (or control device) is designated, the user can trigger the button 28 to execute a function associated therewith.

Figure 3:
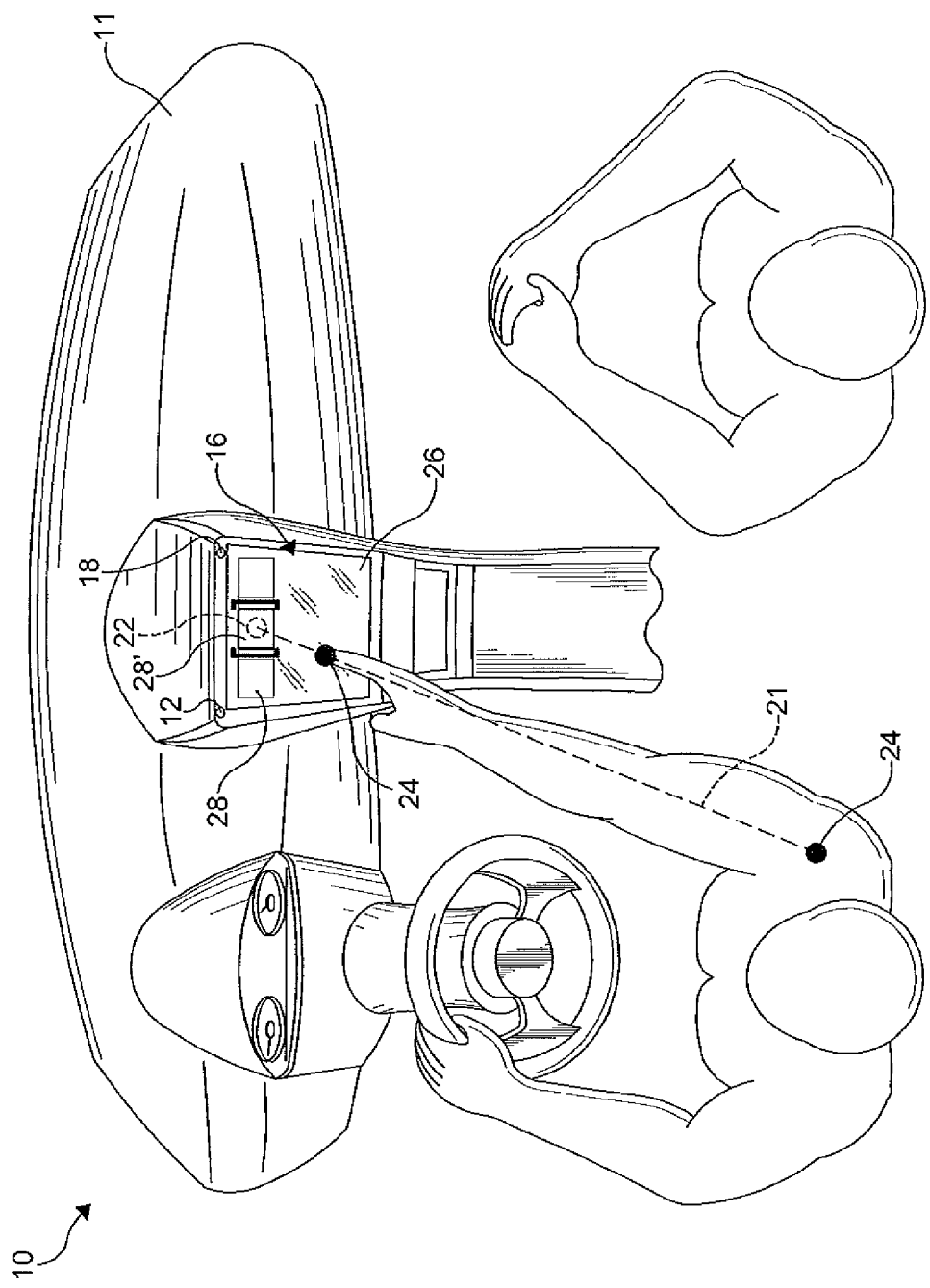
FIG. 3 is a fragmentary top plan view of an interior of a vehicle including the interface system of FIG. 1, showing a driver using the interface system.
Figure 4:
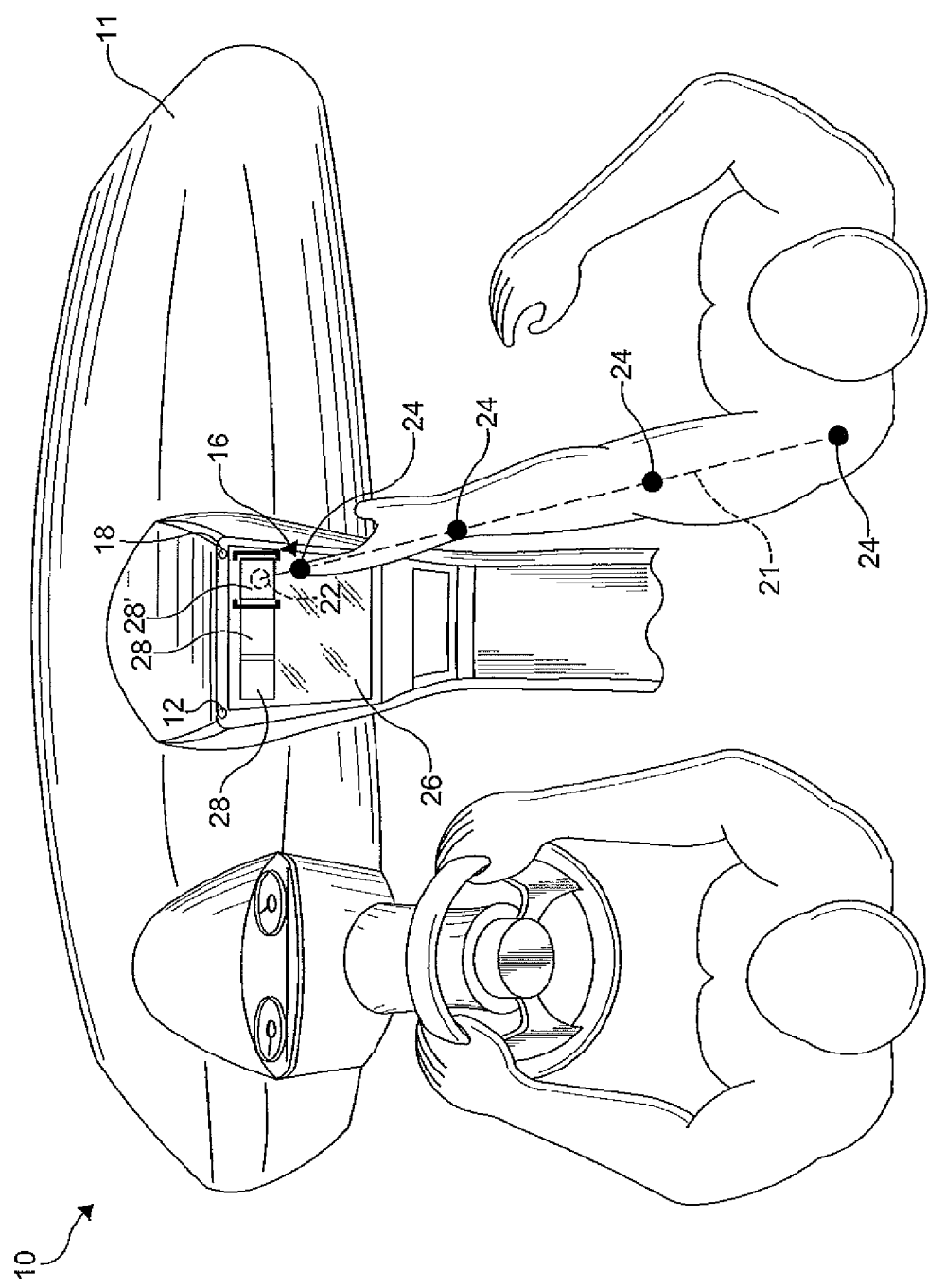
FIG. 4 is a fragmentary top plan view of an interior of a vehicle including the interface system of FIG. 1, showing a passenger using the interface system.

Examples of a personalized configuration (i.e. designation) are shown in FIGS. 3 and 4. As shown in FIG. 3 the user (e.g. a driver of the vehicle 11) is pointing toward a center one of the user engageable buttons 28 and at least one of the sensors 12, 12' detects the extremity of the user within a sensing zone. A portion of the extremity closest to the user interface 16 is stored as one of the vector nodes 24. Additionally, a position of a shoulder of the user is estimated and stored as another one of the vector nodes 24. The processor 14 can then calculate the pointing vector 21 by applying a best fit line algorithm to at least two of the vector nodes 24. The processor 14 simulates an extension of the pointing vector 21 toward the user interface 16. The portion of the user interface 16 intersected by the pointing vector 21 represents a center of the field of pointing 22.

As shown, the center one of the buttons 28 is within the field of pointing 22 and becomes the designated button 28'. For example, the designated button 28' can be illuminated with a greater intensity than the non-designated ones of the buttons 28. As a further example, the designated button 28' may be enlarged on the display 26 relative to a size of the non-designated ones of the buttons 28. As a further non-limiting example, the designated one of the buttons 28' is illuminated by a dedicated light source (not shown) to indicate a state of designation (i.e. configuration). In certain embodiments a visual icon (not shown) or cursor is presented on the display 26 within the field of pointing 22 to provide a visual cue to the user of the location of the field of pointing 22.

As shown in FIG. 4 the user (e.g. a passenger of the vehicle 11) is pointing toward a rightward one of the user engageable buttons 28 and at least one of the sensors 12, 12' detects the extremity of the user within a sensing zone. A plurality of the vector nodes 24 are assigned to various portions of the detected extremity of the user. The processor 14 can then calculate the pointing vector 21 by applying a best fit line algorithm to at least two of the vector nodes 24. The processor 14 simulates an extension of the pointing vector 21 toward the user interface 16. The portion of the user interface 16 intersected by the pointing vector 21 represents a center of the field of pointing 22.

As shown, the center one of the buttons 28 is within the field of pointing 22 and becomes the designated button 28'. For example, the designated button 28' can be illuminated with a greater intensity than the non-designated ones of the buttons 28. As a further example, the designated button 28' may be enlarged on the display 26 relative to a size of the non-designated ones of the buttons 28. As a further non-limiting example, the designated one of the buttons 28' is illuminated by a dedicated light source (not shown) to indicate a state of designation (i.e. configuration). In certain embodiments a visual icon (not shown) or cursor is presented on the display 26 within the field of pointing 22 to provide a visual cue to the user of the location of the field of pointing 22.

In certain embodiments, only the visual output within the field of pointing 22 of the user is fully illuminated, while the visual output outside of the field of pointing 22 is subdued or made invisible. As the pointing vector 21 of the user changes, the user interface 16 is automatically configured to highlight or emphasize the visual output of the display 26 within the field of pointing 22 of the user. It is understood that any visual output of the user interface 16 can be configured in a similar fashion as the designated buttons 28' of the above example. It is further understood that various configurations of the user interface 16 can be used based upon any level of change to the pointing vector 21 of the user. It is further understood that that any user interface, button, or control device (e.g. climate control, radio control, can be designated within the field of pointing 22 in order for the user to execute a function associated therewith in a touchless manner.

Once at least a portion of the user interface 16 (or other component, e.g. user engageable buttons 28) has been designated (highlighted, emphasized), the user can engage the designated portion (e.g. button 28') in a touchless manner by executing a pre-defined gesture with the extremity of the body of the user. For example, the user can simulate a trigger pulling motion with a finger in order to "engage" the designated button 28'. The pre-defined gestures can be used in combination with another controls such as a voice command or a physical engagement (i.e. pressing a button on the steering wheel) to actuate a command. In certain embodiments, a user (e.g. vehicle passenger) is locked-out of certain components and user engageable buttons 28 such as controls for head lights and hazard lights, for example.

It is understood that the user can manually modify the configuration of the user interface 16 and the executable functions associated therewith. It is further understood that the interface system 10 may provide a selective control over the automatic configuration of the user interface. For example, the user interface 16 may always revert to the default configuration unless the user initiates a pointing mode or touchless mode, wherein the user interface 16 is automatically configured to the personalized configuration associated with the pointing vector 21 of a user.

The interface system 10 and methods of configuring the user interface 16 provide a real-time personalization of the user interface 16 based upon the position of the user and the calculated pointing vector 21, thereby focusing the attention of the user to the portion of the user interface 16 within the field of pointing 22 and minimizing the distractions presented by non-focus visual outputs.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An adaptive interface system comprising:
   a user interface for controlling a vehicle system;
   a sensor for detecting a position of an extremity of a user and generating a sensor signal representing the position of the extremity; and
   a processor in communication with the sensor and the control device, wherein the processor receives the sensor signal, analyzes the sensor signal based upon an instruction set to determine a pointing vector of the user, wherein the instruction set is an algorithm for determining the pointing vector based upon the position of the extremity of the user relative to the user interface and an estimated position of another portion of a body of the user, and configures the user interface based upon the pointing vector of the user.

2. The interface system according to claim 1, wherein the user interface includes a user-engageable button associated with an executable function of the vehicle system.

3. The interface system according to claim 1, wherein the user interface is disposed in an interior of a vehicle.

4. The interface system according to claim 1, wherein the sensor is a tracking device for capturing an image of at least the extremity of the user.

5. The interface system according to claim 1, wherein the sensor is a projected capacitance sensor.

6. The interface system according to claim 1, wherein the sensor is integrated with user interface to detect the position of the extremity of the user relative to the user interface.

7. The interface system according to claim 1, wherein the instruction set is an algorithm for determining a position of the extremity of the user relative to the user interface.

8. The interface system according to claim 1, wherein the extremity is at least one of a finger, a hand, and an arm of the user.

9. The interface system according to claim 1, further comprising a source of electromagnetic radiation to illuminate at least a portion of the user to facilitate the detecting the position of the extremity of the user.

10. An adaptive interface system for a vehicle comprising:
    a user interface disposed in an interior of the vehicle, the user interface having a display for communicating an information to a user representing a condition of a vehicle system;
    a sensor for detecting a position of an extremity of a user and generating a sensor signal representing the position of a portion of the extremity of the user closest to the user interface;
    a storage device for storing a vector node representing an estimated position of a portion of a body of the user; and
    a processor in communication with the sensor, the storage device, and the user interface, wherein the processor receives the sensor signal, determines a pointing vector of the extremity of the user based upon at least the position of the portion of the extremity of the user closest to the user interface and the vector node, and configures the display based upon the pointing vector of the extremity of the user to emphasize a particular visual output presented on the display.

11. The interface system according to claim 10, wherein the sensor is a tracking device for capturing an image of at least the extremity of the user.

12. The interface system according to claim 10, wherein the sensor is a projected capacitance sensor.

13. The interface system according to claim 10, wherein the sensor is integrated with the user interface to detect the position of the portion of the extremity of the user relative to the user interface.

14. The interface system according to claim 10, wherein the processor determines the pointing vector by calculating a best fit line based upon at least the position of the portion of the extremity of the user closest to the user interface and the vector node.

15. The interface system according to claim 10, wherein the extremity is at least one of a finger, a hand, and an arm of the user.

16. The interface system according to claim 10, wherein the processor configures the display based upon the pointing vector of the extremity of the user to highlight a portion of the visual output within a field of pointing of the user.

17. A method for configuring a display, the method comprising the steps of:
    providing a user interface for controlling a vehicle system;
    providing a sensor to detect a position of at least a portion of an extremity of a body of a user;
    defining a vector node associated with an estimated position of a pre-determined portion of the body of the user;
    determining a pointing vector derived from the position of the extremity of the body of the user and the vector node; and
    configuring the user interface based upon the pointing vector to designate at least a portion of the user interface within a field of pointing of the pointing vector.

18. The method according to claim 17, wherein the vector node represents a portion of the body of the user that is substantially static relative to the user interface, while the user interacts with the user interface.

19. The method according to claim 17, wherein the step of determining a pointing vector includes calculating a best fit line based upon at least a position of the portion of the extremity of the user closest to the user interface and the vector node.

\* \* \* \* \*